US011934296B2

(12) United States Patent
Patti et al.

(10) Patent No.: US 11,934,296 B2
(45) Date of Patent: Mar. 19, 2024

(54) IDENTIFICATION AND RETRIEVAL OF SUPPLEMENTAL INFORMATION FOR RUNBOOK OPERATIONS

(71) Applicant: Oracle International Corporation, Redwood Shores, CA (US)

(72) Inventors: Raghu Hanumanth Reddy Patti, San Bruno, CA (US); Christopher A. Roy, Amherst, NH (US); Ana Maria Hernandez McCollum, Belmont, CA (US); Manas Goswami, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/725,147

(22) Filed: Apr. 20, 2022

(65) Prior Publication Data
US 2023/0061007 A1 Mar. 2, 2023

Related U.S. Application Data

(60) Provisional application No. 63/261,832, filed on Sep. 29, 2021, provisional application No. 63/236,563, (Continued)

(51) Int. Cl.
*G06F 11/00* (2006.01)
*G06F 11/07* (2006.01)
(Continued)

(52) U.S. Cl.
CPC ........ *G06F 11/3636* (2013.01); *G06F 11/079* (2013.01); *G06F 11/0793* (2013.01); (Continued)

(58) Field of Classification Search
CPC ............... G06F 11/079; G06F 11/0793; G06F 2201/86; G06F 11/3051; G06F 11/3466; G06F 11/366
See application file for complete search history.

(56) References Cited

U.S. PATENT DOCUMENTS 8,533,608 B1 9/2013 Tantiprasut
8,713,436 B2 4/2014 Cheng et al.
(Continued)

FOREIGN PATENT DOCUMENTS

WO 2015/065356 A1 5/2015

OTHER PUBLICATIONS

"Assigning System Center Orchestrator Runbooks Permissions", Retrieved at https://docs.flexera.com/appportal2017/Content/helplibrary/AP_ConnectMSOrch.htm, Retrieved on May 2022, 2 Pages.

(Continued)

*Primary Examiner* — Charles Ehne
(74) *Attorney, Agent, or Firm* — Invoke

(57) ABSTRACT

Techniques for generating supplemental information based on runbook operation results are disclosed. A system generates and displays supplemental information for a runbook execution interface based on one of a system component associated with an executable operation of a runbook, and a set of runbook operation results corresponding to the executable operation. The system receives a user input to execute an operation defined by a runbook presented to remediate an event. The system generates supplemental information for the runbook execution interface based on the results of the operation executed by the user. The system identifies characteristics associated with the runbook operation results and identifies sources for additional information. Source may include performance data from the same component over a
(Continued)

different period of time, performance data of a similar component, and performance data of topologically-connected components.

22 Claims, 7 Drawing Sheets

Related U.S. Application Data filed on Aug. 24, 2021, provisional application No. 63/236,557, filed on Aug. 24, 2021, provisional application No. 63/236,565, filed on Aug. 24, 2021, provisional application No. 63/236,561, filed on Aug. 24, 2021.

(51) Int. Cl.

| | | |
|---|---|---|
| *G06F 11/30* | (2006.01) | |
| *G06F 11/34* | (2006.01) | |
| *G06F 11/36* | (2006.01) | |
| *G06Q 10/0631* | (2023.01) | |
| *G06Q 10/0633* | (2023.01) | |
| *G06Q 10/0637* | (2023.01) | |
| *G06Q 10/10* | (2023.01) | |
| *G06Q 10/20* | (2023.01) | |
| *H04L 43/02* | (2022.01) | |
| *H04L 67/00* | (2022.01) | |
| *H04L 67/50* | (2022.01) | |

(52) U.S. Cl.
CPC ...... *G06F 11/3051* (2013.01); *G06F 11/3065* (2013.01); *G06F 11/3438* (2013.01); *G06F 11/3466* (2013.01); *G06F 11/3495* (2013.01); *G06F 11/366* (2013.01); *G06Q 10/06316* (2013.01); *G06Q 10/0633* (2013.01); *G06Q 10/0637* (2013.01); *G06Q 10/103* (2013.01); *G06Q 10/20* (2013.01); *H04L 43/02* (2013.01); *G06F 2201/86* (2013.01); *H04L 67/00* (2013.01); *H04L 67/535* (2022.05)

(56) References Cited

U.S. PATENT DOCUMENTS

| | | | |
|---|---|---|---|
| 9,164,965 B2 | 10/2015 | Molesky et al. | |
| 9,819,547 B2 | 11/2017 | Maini et al. | |
| 9,891,971 B1 * | 2/2018 | Kuhhirte | G06F 11/0709 |
| 10,120,552 B2 | 11/2018 | King et al. | |
| 10,379,990 B2 | 8/2019 | Krishnamoorthy et al. | |
| 10,678,610 B2 | 6/2020 | Ebrahimi et al. | |
| 10,769,043 B2 | 9/2020 | Sabharwal et al. | |
| 10,866,872 B1 | 12/2020 | Gudka et al. | |
| 10,970,632 B2 | 4/2021 | Sabharwal et al. | |
| 11,080,121 B2 | 8/2021 | Thornhill et al. | |
| 11,550,652 B1 * | 1/2023 | Arora | G06F 11/3442 |
| 2005/0223285 A1 | 10/2005 | Faihe et al. | |
| 2012/0303772 A1 | 11/2012 | Ennis | |
| 2013/0090996 A1 | 4/2013 | Stark | |
| 2013/0103973 A1 | 4/2013 | Werth et al. | |
| 2017/0090736 A1 | 3/2017 | King et al. | |
| 2019/0391892 A1 | 12/2019 | Sabharwal et al. | |
| 2019/0392310 A1 | 12/2019 | Sabharwal et al. | |
| 2020/0004618 A1 | 1/2020 | Thornhill et al. | |
| 2020/0136928 A1 | 4/2020 | Sethi et al. | |
| 2020/0167255 A1 | 5/2020 | Gudka et al. | |
| 2020/0204428 A1 | 6/2020 | Sasidharan et al. | |
| 2021/0191769 A1 * | 6/2021 | Eschinger | G06F 9/5077 |
| 2021/0279160 A1 | 9/2021 | Huang et al. | |
| 2021/0333953 A1 | 10/2021 | Fitzgerald et al. | |
| 2022/0067620 A1 | 3/2022 | Thornhil et al. | |
| 2022/0342796 A1 | 10/2022 | Cui et al. | |
| 2022/0414571 A1 | 12/2022 | Buggins et al. | |
| 2023/0034173 A1 | 2/2023 | Russell et al. | |
| 2023/0062588 A1 | 3/2023 | Patti et al. | |

OTHER PUBLICATIONS

"Automation Hybrid Runbook Worker overview", Retrieved at https://docs.microsoft.com/en-us/azure/automation/automation-hybrid-runbook-worker, Retrieved on Apr. 29, 2022, 11 Pages.

"AWS Systems Manager Automation", Retrieved at https://docs.aws.amazon.com/systems-manager/latest/userguide/systems-manager-automation.html, Retrieved at May 2022, 4 Pages.

"Build & Run Remediation Runbook", Retrieved at https://wellarchitectedlabs.com/operational-excellence/200_labs/200_automating_operations_with_playbooks_and_runbooks/4_build_run_remediation_runbook/, Retrieved on May 2022, 9 Pages.

"Complex deployments made easy", Retrieved at https://octopus.com/, Retrieved on May 2022, 6 Pages.

"Configure runbook output and message streams", Retrieved at https://docs.microsoft.com/en-us/azure/automation/automation-runbook-output-and-messages, Jul. 10, 2021, 17 Pages.

"Datasheet-NetBrain-Integrated-Edition-7.0", Retrieved at https://www.netbraintech.com/wp-content/uploads/2017/09/Datasheet-NetBrain-Integrated-Edition-7.0.pdf, Retrieved at May 2022, 2 Pages.

"DRYiCE iAutomate v5.0", Retrieved at https://www.dryice.ai/releases/dryice-iautomate-v50, Retrieved on May 2020, 7 Pages.

"DRYiCE iAutomate" Retrieved at https://www.dryice.ai/resource/brochure/dryice-iautomate, Retrieved on May 2022, 2 Pages.

"DRYiCE iAutomate", Retrieved at https://www.dryice.ai/products-and-platforms/iautomate, Retrieved on May 2022, 7 Pages.

"Evolution of Artificial Intelligence for IT Operations", Retrieved at https://www.siliconindia.com/viewpoints/cxoinsights/evolution-of-artificial-intelligence-for-it-operations-nwid-10000.html, Retrieved on May 2022, 4 Pages.

"HCL Hero—Workload Automation", Retrieved at https://solutions.hcldoc.com/HCL_HERO/!SSL!/Responsive_HTML5/Overview/Product_Overview.htm, Retrieved on May 2022, 2 Pages.

"How a Simple Misconfiguration Can Ruin Everyone's Day—NetBrain", Retrieved at https://www.netbraintech.com/blog/human-error-the-forgotten-single-point-of-failure/, Apr. 28, 2017, 7 Pages.

"IBM Runbook Automation and IBM Alert Notification deliver more agile, automated operations management", Retrieved at https://www.IBM.com/common/ssi/ShowDoc.wss?docURL=/common/ssi/rep_ca/1/897/ENUS216-031/index.html, Feb. 16, 2016, 16 Pages.

"IBM Runbook Automation Guide", Retrieved at https://webcache.googleusercontent.com/search?q=cache:jZ5yusTVFAEJ:https://www.IBM.com/support/knowledgecenter/SSZQDR/com.ibm.rba.doc/rba_pdf_guide.pdf+&cd=11&hl=en&ct=clnk&gl=in, Retrieved on May 2022, 138 Pages.

"Manage role permissions and security in Automation", Retrieved at https://docs.microsoft.com/en-us/azure/automation/automation-role-based-access-control, Sep. 26, 2021, 30 Pages.

"Microsoft Azure Automation _ Netreo", Retrieved at https://www.netreo.com/wpsandbox/solutions/microsoft-azure-automation/, Retrieved at May 2022, 5 Pages.

"Octopus Deploy 2019.11: Operations Runbooks RTW", Retrieved at https://octopus.com/blog/octopus-release-2019.11, Dec. 18, 2019, 4 Pages.

"Octopus Deploy Documentation—Runbooks", Retrieved at https://octopus.com/docs/runbooks, Retrieved on May 2022, 2 Pages.

"Runbook Automation (Rundeck)", Retrieved at https://www.pagerduty.com/resources/learn/aiops-incident-management-2021/, Retrieved on May 2022, 8 Pages.

"Runbooks permissions", Retrieved at https://octopus.com/docs/runbooks/runbook-permissions, Retrieved at May 2022, 2 Pages.

"The Guide to Automating Runbook Execution—Shoreline", Retrieved at https://shoreline.io/blog/the-guide-to-automating-runbook-execution, Feb. 25, 2021, 9 Pages.

"Troubleshoot Azure Automation runbook issues _ Microsoft Docs", Retrieved at https://docs.microsoft.com/en-us/azure/automation/troubleshoot/runbooks, Sep. 24, 2021, 26 Pages.

(56) References Cited

OTHER PUBLICATIONS

"Use runbooks to automate operations activities", Retrieved at https://www.ibm.com/garage/method/practices/manage/runbooks-to-automate-operations/, Retrieved on May 2022, 9 Pages.
"What is Azure Automation Management—Netreo Newtork Moniroting Tool", Retrieved at https://www.netreo.com/cloud-automation/what-is-azure-automation-management/, Sep. 9, 2015, 2 Pages.
"What is Runbook Automation?", Retrieved at https://www.rundeck.com/what-is-runbook-automation, Retrieved on May 2022, 10 Pages.

* cited by examiner

IDENTIFICATION AND RETRIEVAL OF SUPPLEMENTAL INFORMATION FOR RUNBOOK OPERATIONS

BENEFIT CLAIMS; RELATED APPLICATIONS; INCORPORATION BY REFERENCE

This application claims the benefit of U.S. Provisional Patent Application 63/262,832 filed on Sep. 29, 2021; U.S. Provisional Patent Application 63,236,557, filed Aug. 24, 2021, U.S. Provisional Patent Application 63/236,561, filed August 24; U.S. Provisional Patent Application 63/236,563, filed August 24; U.S. Provisional Patent Application 63/236, 565, filed August 24, all of which are hereby incorporated by reference. This application also incorporates by reference the following applications: application Ser. No. 17/725,116, filed on Apr. 20, 2022 titled "Method and System for Recommending Runbooks for Detected Events; application Ser. No. 17/725,122, filed on Apr. 20, 2022 titled "Recommending a Candidate Runbook Based on a Relevance of the Results of the Candidate Runbook to Remediation of an Event"; application Ser. No. 17/725,143, filed on Apr. 20, 2022 titled "Automated Runbook Operation Recommendations".

This application further incorporates by reference, in their entirety, U.S. Pat. Nos. 9,164,965, 10,379,990, and 10,678, 610.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to runbooks. In particular, the present disclosure relates to recommending appropriate runbook operations during a runbook generation process.

BACKGROUND

Modern information technology systems include a large number of different types of components. For example, there may be database systems, network systems, computer applications, and the like. Each such system may be administered and/or monitored by specialized IT professionals.

During normal operation, a computer system may produce or encounter behavior or results that are not expected or desired by the operators monitoring the system. Such behavior or results may generate event records (for example, process is running slow, or process is stalled). Upon encountering an event log or incident message, a user may wish to resolve the issue by executing one or more remediation tasks. A user may execute remediation tasks to address an event as defined by a runbook. Alternatively, or in addition, the user may execute remediation tasks defined by a runbook to address a user-perceived issue that did not generate an event.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
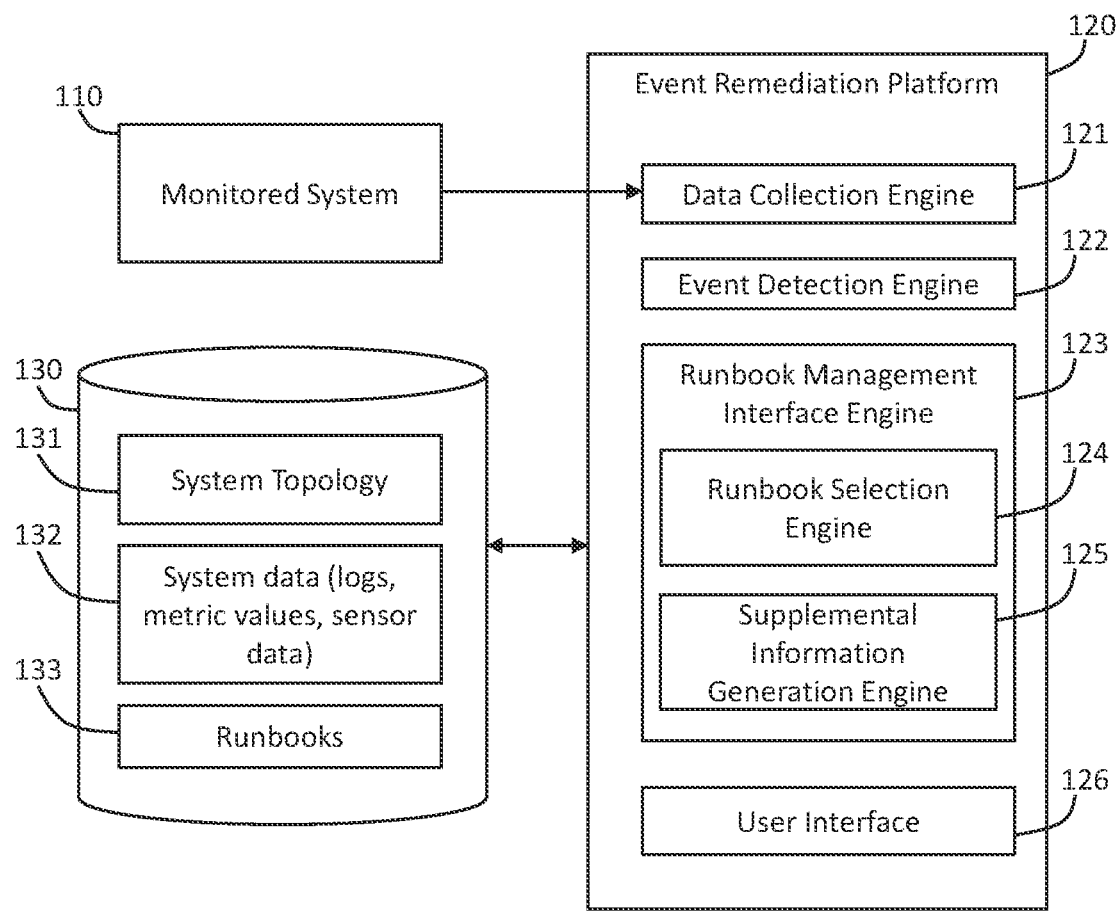
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING SUPPLEMENTAL INFORMATION FOR RUNBOOK OPERATIONS
4. EXAMPLE EMBODIMENT: RUNBOOK EXECUTION INTERFACE
5. MACHINE LEARNING ENGINE TRAINING
6. COMPUTER NETWORKS AND CLOUD NETWORKS
7. MISCELLANEOUS; EXTENSIONS
8. HARDWARE OVERVIEW

1. General Overview

A runbook defines a set of independently executable operations. In an example, a runbook defines operations for remediating an issue. The set of remediation operations may be used to diagnose a problem, an undesired event, undesired behavior, and/or user-perceived issue. The set of remediation operations may fix the problem, address the undesired event/behavior, and/or obtain more event data for further analysis by a user.

A user may initiate the execution of an operation by a runbook without initiating execution of other operations of the same runbook. Runbook operations may or may not be executed in a same order as included in the runbook. A runbook operation may be executable by a machine(s) without any additional user input subsequent to an initial input that initiates the execution of the operation. Alternatively, a runbook operation may require additional user input subsequent to the initial input that initiates the execution of the operation.

One or more embodiments generate and display supplemental information for a runbook execution interface based on one of: (a) a system component associated with an executable operation of a runbook, and (b) a set of runbook operation results corresponding to the executable operation. In one embodiment, the system detects an event for remediation. The system receives a user input to execute an operation defined by a runbook presented to remediate the event. The system may generate supplemental information for the runbook execution interface based on the results of the operation executed by the user. For example, a user may execute a runbook operation to perform a diagnostics operation on a system to obtain system performance information. The system may generate and display the additional information—such as expected performance information—together with the measured performance information. In addition, or in the alternative, the system may generate supplemental information based on the system component, independent of the execution of a runbook operation. For example, the system may identify an operation in a runbook to execute diagnostics on a server. The system may obtain system information, such as specifications for the server, prior to the user executing the runbook operation to perform the diagnostics.

In one embodiment, the system selects one or more types of supplemental information to generate and display, including: past performance of the system component, performance of similar system components, and an expected performance of the system component. The system may display the supplemental information together with runbook operation results. For example, the system may overlay a graphic of the supplemental information over a graphic of runbook operation results. Alternatively, the system may display the supplemental information alone or alongside a display of the runbook operation results.

In one embodiment, the system generates the supplemental information based on identifying a topological relationship between a system component associated with a runbook operation and other system components. For example, the system may identify a first system component, such as a load balancer in a network system, as being the subject of the runbook operation. The system may retrieve performance data from related system components, such as computers in a work group that is serviced by the load balancer. The system may display the information associated with the computers in the work group together with any information obtained from the load balancer.

In one embodiment, the system generates the supplemental information based on another set of runbook operation results. For example, if the runbook operations were previously executed, the system may retrieve the previous results to display for an operator alongside presently-generated runbook results. As another example, if the same runbook operations were previously applied to a similar component, the system may retrieve the results associated with the other component for comparison with presently-generated runbook results.

In one embodiment, the system applies a machine learning model to a set of data to identify the additional information that should be obtained in connection with one or more independently executable operations of a runbook. For example, the system may detect an event in a network. The system may apply a machine learning model to the network data to identify: (1) one or more runbooks for remediating the event, and (2) supplemental information to be provided together with a selected runbook. For example, if the system detects a server failure in the network, the system may apply the machine learning model to the network data to identify the runbooks needed to address the server failure. The system may further identify that supplemental information related to the runbook operations, such as: (1) server load over a time period prior to the failure, (2) expected server load over the same time period, and (3) performance data of other system components in communication with the server. The system may provide the supplemental information to an operator responsive to receiving an input to execute an operation in the runbook. The machine learning model may be trained to identify correlations among metrics related to multiple components. A set of data may be applied to the model to identify other components or measurements correlated to a target component or measurement.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes an event remediation platform 120. In one or more embodiments, the event remediation platform 120 is a hardware and/or software system for generating, presenting, and/or executing runbooks. Components of the event remediation platform 120 may be implemented on a single computing device or distributed across a number of different computing devices. In an example, an event remediation platform 120 may include a data collection engine 121. The data collection engine 121 collects data, such as log data, sensor data, analog and digital device status data, and program state data from a monitored system 110. The data collection engine 121 may also obtain system data 132 from a data repository 130. The system data 132 may include log data, sensor data, and metric values of system performance metrics generated by the monitored system 110.

An event detection engine 122 monitors the data obtained by the data collection engine 121 to detect an event in the system 110. For example, the event detection engine 122 may monitor activity logs generated by one or more applications running in the system 110 and sensor data generating output values based on characteristics of devices in the system 110 to detect a failure of one or more components in the system 110. Examples of events may include: a computing device failing or operating below a defined threshold, an application failing or operating below a defined threshold, access to a device or application by an unauthorized entity, data transmission rates below a defined threshold, data latency along communication channels above a defined threshold, data lost along communication channels above a defined threshold, and sensor levels monitoring system components exceeding, or failing to meet, defined thresholds.

A runbook management interface engine 123 generates an interface, such as a graphical user interface (GUI) accessible by a user via the user interface 126 to create, modify, delete, select, and execute runbooks. The runbook management interface engine 123 may recommend one or more runbooks for execution based on detecting an event in the monitored system 110. In addition, or in the alternative, the runbook management interface engine 123 may recommend one or more runbooks for execution based on detecting user activity—such as interacting with one or more applications or datasets to remediate an event. In addition, or in the alternative, the runbook management interface engine 123 may recommend one or more runbooks for execution based on a user running the runbook management interface engine 123. In addition, or in the alternative, the runbook management interface engine 123 may allow a user to search or browse among previously-generated runbooks.

A runbook selection engine 124 presents runbooks for user selection. The runbook selection engine 124 may present the runbooks based on a user search or based on system-generated recommendations, as discussed above. The runbook selection engine 124 displays steps or operations of the runbooks when the user selects a runbook for execution. The steps or operations are independently executable. A user may execute one operation without executing the next operation. Some runbook operations may be executed out of any particular order. For example, a runbook may list ten operations. A user may execute the fourth listed operation prior to the first listed operation. Other runbook operations may require execution in a particular sequence. A first-listed operation may be required to be executed prior to execution of the second-listed operation.

A supplemental information generation engine 125 generates supplemental information associated with the displayed runbooks. The supplemental information is information associated with runbook operations that inform a user about attributes of the runbook operations. For example, a runbook operation may specify that a particular action should be performed on a particular system component or application. The supplemental information may be an image of a portion of the system component to inform the user what to expect when performing the action. In addition, or in the alternative, the supplemental information may be a current status of data associated with the operation. In one or more embodiments, the supplemental information is dynamic information that changes over time. For example, one user may run a runbook and observe supplemental information indicating a first set of data readings associated with a system component that is the object of a runbook operation. At another time, another user may run the same runbook and observe different supplemental information indicating a second set of data readings associated with the same system component. Both users may observe the same set of static information in the runbook operation specifying an action to perform and a system component associated with the action. However, based on a change in system data 132, the supplemental information may change.

The supplemental information generation engine 125 corresponds to software and/or hardware that generates supplemental information to present to an operator in the course of executing of runbook operations. The supplemental information generation engine 125 may generate supplemental information associated with runbook operations, without user instructions to generate the supplemental information, as further described below. The runbook management interface engine 123 presents runbook operations, results of runbook operations, and supplemental information associated with the results.

A data repository 130 includes one or more data storage components that store information in memory. The data repository may store, for example, a system topology 131 associated with a monitored system 110, system data 132 that may be accessed by the supplemental information generation engine 125 to generate supplemental information, and runbooks 133. In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the event remediation platform 120. Alternatively, or additionally, a data repository 130 may be implemented or executed on a computing system separate from the event remediation platform 120. A data repository 130 may be communicatively coupled to the event remediation platform via a direct connection or via a network.

Information describing the system topology 131, system data 132, and runbooks 133 may be implemented across any of components within the system 100. However, this information is illustrated within the data repository 130 for purposes of clarity and explanation.

The event remediation platform 120 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, interface 126 refers to hardware and/or software configured to facilitate communications between a user and the event remediation platform 120. Interface 126 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 126 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 126 is specified in one or more other languages, such as Java, C, or C++.

3. Generating Supplemental Information for Runbook Operations

Figure 2:
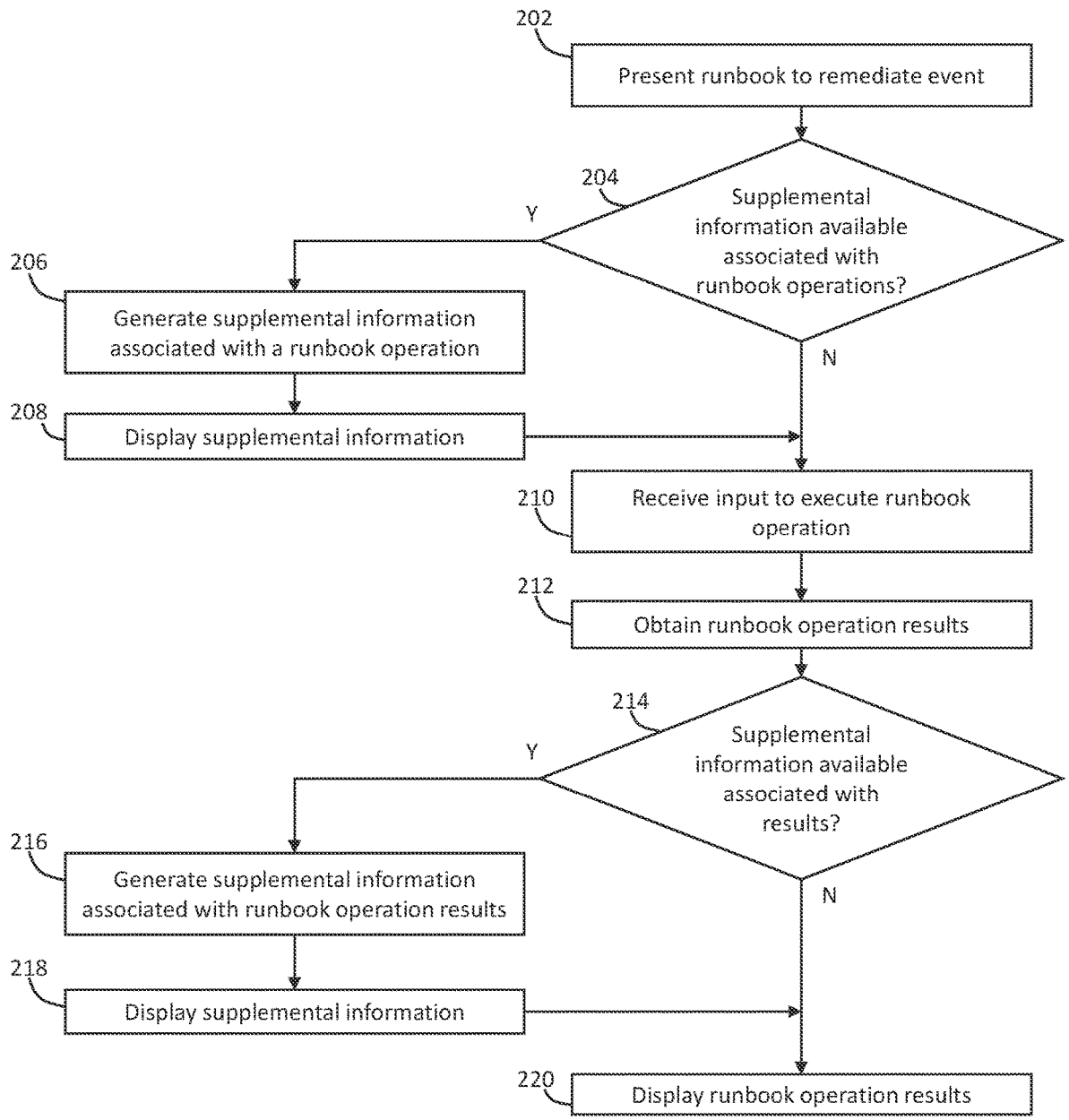
FIG. 2 illustrates an example set of operations for automated recommendation of runbook operations, in accordance with one or more embodiments.

FIG. 2 illustrates an example set of operations for generating supplemental information for runbook operations in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system presents a runbook to remediate an event (Operation 202). The event may be the result of a system monitor detecting a status to trigger operator intervention. Alternatively, the event may be a request from an operator to access a particular runbook. For example, the system may detect a degradation of a communications channel in a monitored system. The system may generate an alert for an operator to perform operations of a runbook to diagnose and remediate the event. Alternatively, an operator may perform a search of stored runbooks and select a runbook, from among the stored runbooks, to view in a runbook execution interface display. The operator may search the stored runbooks without the system detecting any failure in the monitored system. For example, an operator may execute a runbook that includes steps to perform regular maintenance of a system to ensure proper performance of components in the system.

As described above, the runbook may define a list of operations that are independently executable. In other words, a user may execute certain operations of the runbook but may not execute certain other operations of the same runbook. According to one embodiment, operations of a runbook generated using a runbook execution interface may be executed in any sequence. In addition, or in the alternative, some operations may be required to be executed in a particular sequence.

According to one or more embodiments, a runbook execution interface may enable a user to see a list of runbook operations and also one or more of the runbook operations in detail, individually or as part of an execution of some or all of the runbook operations. A runbook execution interface may provide a UI item (e.g., a button labeled "Execute Runbook") that, if selected, executes some or all of the runbook operations in response.

The system determines if supplemental information is available associated with one or more runbook operations of a displayed runbook (Operation 204). For example, a runbook operation may include static information including: (a) a system component and (b) an action to be performed on the system component. The system may determine whether supplemental information exists to assist a user to identify the system component or perform the action. Examples of supplemental information that may be obtained prior to executing operations of a runbook include: an image of a system component, identifying information associated with a system component, such as a serial number or model number, an expected state of sensors or data to be obtained or measured by the action associated with the runbook operation, such as an expected range of values based on historical information associated with the action or based on component specifications, contact information of a user or operator required to perform a runbook operation, and location information associated with the action to be performed, such as a memory address of a register to be read in a runbook operation.

The system may determine whether supplemental information exists by referring to metadata associated with a selected runbook. For example, the system may store metadata associated with one or more runbook operations identifying a location and type of supplemental information to be obtained and/or generated when a user selects a particular runbook. Location information may include, for example, an address in memory of the data, a location in memory of a table storing the address of the data, or a uniform resource locator (URL) specifying a network address from which the supplemental data may be obtained. The supplemental information may be local to the system in which the runbook is executed. Alternatively, the supplemental information may be remote from the system in which the runbook is executed. The system may access the remote supplemental information over a network, such as the Internet.

According to one or more embodiments, the system identifies supplemental information based on data generated by a run-time computing environment. For example, if a user selects a runbook to address a particular system component, the system may analyze recently-generated log data associated with the component or connected components to determine whether the log data includes values related to operations of the selected runbook.

According to one or more embodiments, the system generates supplemental information associated with a detected event, independently of particular runbook operations. For example, the system may detect a user selection of a runbook to reset a particular server. The system may identify data related to the server such as a temperature in an environment in which the server is located, applications running on the server, and data transmission rates to or from the server within the past hour. The system may identify, generate, and display the supplemental information even if the runbook does not include any operations associated with determining the temperature in the server room, determining applications running on the server, or determining data transmission rates to or from the server.

Based on determining that supplemental information is available, the system generates the supplemental information associated with one or more runbook operations (Operation 206). In one embodiment, the system may generate the supplemental information associated with operations in the presented runbook prior to the operator performing any specific operation specified in the runbook. For example, the system may detect the user selecting a runbook to perform a maintenance check on a network gateway device. The system may retrieve, without specific user instructions, supplemental information, including: a device diagram, device specifications, information about devices in communication with the network gateway device, an expected performance information about the network gateway device.

According to another example, the system may display an email address and telephone number of a technician required to access a power unit associated with a runbook operation to "check power to power unit." According to one embodiment, the user may not have access to the power unit. Accordingly, the user may be required to contact another entity to perform the runbook operation.

According to another example, the system may display an image of physical port locations on a gateway device associated with a runbook operation "check physical communication channel ports." The system may display the image of the physical port locations prior to the user taking any action associated with the runbook operation. According to another example, the system may retrieve from data storage a public encryption key associated with a runbook operation "check encrypted data content in data register A." The user may be prevented from accessing the encrypted data without the public encryption key. According to yet another example, the system may retrieve from a data specification for a data processing chip threshold data transfer rates associated with a runbook operation "check data transfer logs." The system may retrieve from a data specification for a data processing chip threshold data transfer rates prior to the user taking any action associated with the runbook operation.

According to one embodiment, the system generates the supplemental information by executing code of a runbook management system that uses as input: (a) a runbook operation and/or (b) a set of runbook operation results. For example, a runbook operation may specify that a user should perform a particular action on a particular component and observe the results. The system may generate supplemental information associated with the component—such as retrieving component specifications. In addition, or in the alternative, the system may generate supplemental information associated with the results of the action performed on the component. For example, the system may generate a graph displaying how a reading obtained by the user's action on the component, varies from the component specifications. For example, a voltage level measured at a particular terminal of the component may be outside the component-specified level.

The system displays the supplemental information together with a visual representation of the runbook (Operation 206). For example, the system may present a visual depiction of the runbook entitled: "Maintenance check for network gateway device" together with a diagram of the network gateway device having communications ports labeled or highlighted, and specified data transmission speeds identified. The system displays the supplemental information in a manner that indicates a relationship between the supplemental information and the runbook operation to which the supplemental information pertains. For example, each runbook operation may be represented by a rectangular shape in a runbook interface. The supplemental information may be displayed in the same rectangular shape as its respective runbook operation. According to another example, the supplemental information may be displayed in a window adjacent to a runbook operation—either to the side or below the associated runbook operation. According to another example, the runbook is displayed in one window of a runbook user interface and the supplemental information is displayed in another window, such as a split screen of a display device. For example, when a user selects a particular runbook operation on one side of a split screen, the associated supplemental information may be displayed at a same location on the other side of the split screen. When the user selects a different runbook operation, the system replaces the displayed supplemental information on the other side of the split screen with different supplemental information associated with the presently-selected runbook operation. According to yet another embodiment, the supplemental information may be displayed in an overlapping window, such as a pop-up window on a runbook interface. If a user selects a runbook operation that does not include supplemental information, the pop-up window may disappear from the runbook interface.

The system receives an input to execute a runbook operation (Operation 208). For example, a runbook may include five operations for an operator to perform. One of the operations may include "determine whether data transmission speeds are within specified levels." A user may execute the runbook operation by accessing the data transmission speeds of the network gateway device for the past three months. According to one embodiment, the system detects the user operation and associates the user operation with the runbook operation. For example, in one embodiment, a runbook user interface allows the user to interact with a user interface element to perform the operation. In another embodiment, a user may run an operation associated with a runbook operation without interacting with the runbook user interface. The system may detect the operation run by the user and map the operation to an applicable runbook operation.

The system may display the supplemental information in a spatial vicinity of the runbook operations associated with the supplemental information. For example, a runbook operation may be displayed as a user interface element represented by a rectangular shape. Inside the rectangular shape, the system may display a name of the operation and a description of an action to be performed to complete the operation. The system may also display the supplemental information within the rectangular shape, indicating that the supplemental information is associated with the operation. Additional supplemental information associated with another runbook operation in the same runbook is displayed within a separate rectangular-shaped interface element representing a separate runbook operation. In addition, or in the alternative, the system may represent supplemental information for a particular runbook operation to the side of, or below, the runbook operation to which the supplemental information is associated. For example, the system may display a shape associated with the runbook operation. The system may display the supplemental information below, and offset from, the runbook operation.

According to another embodiment, the system may indicate the supplemental information is associated with a runbook operation by generating a connecting element, such as a line connecting the operation to the supplemental information, a color pattern connecting the operation to the supplemental information, or a same shading connecting the operation to the supplemental information.

The system receives an input to execute a runbook operation (Operation 210). For example, a user may interact with a user interface element on a visual depiction of the runbook. In one or more embodiments, a computer executes the runbook operation based on a user input. For example, a runbook operation may be displayed together with a selectable user interface element. Selection of the user interface element may result in the computer performing the corresponding operation. For example, a runbook operation named "run antivirus software" may include a selectable button that, when selected, causes the computer to run the antivirus software. According to an alternative embodiment, a user may execute the runbook operation independently of a computer. For example, a runbook operation named "check data port connector" may direct a user to check the physical connection of a data cord with a data port. The depiction of the runbook operation may include a selectable element indicating the operation has been completed by the user. The system may then highlight the next operation in the runbook. According to yet another embodiment, the system may execute a runbook operation with a combination of user action and computer action. For example, a runbook operation named "compare data transfer rates to thresholds" may be displayed with a selectable button to "obtain data transfer rates." The system may obtain the measured data transfer rates from system logs based on a user selection. The user may then compare the computer-retrieved values to threshold values to execute the runbook operation.

The system obtains runbook operation results (Operation 212). The system results may be obtained based on computer actions, user actions, and combinations of computer actions and user actions. As discussed above, a computer-implemented runbook operation may include running antivirus software. The computer may run the antivirus software and display results, such as "malware detected," "virus detected," and "10 items require attention." The operation results may include a user input when the runbook operation is user-implemented independent of a computer. According to another example, a monitoring device may measure a temperature in a server room. According to additional examples, a computer may measure data transmission rates (e.g., running a network speed test) and voltages and currents within electronic circuits. According to another example, a system may download data describing data storage or data transmission of a device over time. In the example in which the user checks the physical connection between a data cable and a data port, a user may select an icon indicating "connection secure." Additional examples include observing a physical condition of a wire (e.g., where frayed or intact), connection (e.g., wiring is physically severed), a circuit board, rack, or any physical characteristic of a network component.

The system determines whether supplemental information exists associated with the runbook operation results (Operation 214). An example of supplemental information associated with runbook results includes a display comparing measured, downloaded, or user-entered data with threshold values. For example, the system may overlay data transmission rates of a system component over a predefined period of time with expected or threshold data transmission rates over the period of time. Another example includes retrieving a detailed description of an error based on results indicating an error code. Another example includes retrieving a different runbook associated with a particular runbook step based on detecting an anomaly in the step. For example, a user may enter information indicating that a server will not boot properly. The system may determine that a runbook exists associated with servers not booting properly.

Based on determining that supplemental information exists associated with runbook operation results, the system generates the supplemental information (Operation 216). For example, the system may detect a type of runbook operation executed by an operator and may identify and generate supplemental information based on the executed operation. According to one example, the system identifies a component characteristic associated with a runbook operation and retrieves or calculates expected values for the component characteristic. For example, if an operator retrieves the data transmission rates for the component over a three-month period of time, the system may generate an expected value for the component characteristic over the same period of time. According to another example, if a user obtains values for a component characteristic over one period of time, the system may obtain values for the component characteristic over a different period of time. For example, if an operator retrieves the data transmission rates for the component over the most-recent three-month period of time, the system may retrieve the data transmission rates for the same component during the previous three months or during the same three-month period of the previous year. The system may select other periods of time for comparison based on a workload similarity or an environmental similarity to a period of time corresponding to the results of the runbook operation.

If a user obtains values for a component characteristic over one period of time, the system may obtain values from similar components over the same period of time. For example, if an operator retrieves the data transmission rates for a load-balancer component over the most-recent three-month period of time, the system may retrieve the data transmission rates for another load-balancer in the same region of the data center over the same three-month period time.

The system may generate supplemental information by analyzing a system topology to identify additional system components that are connected to the component being addressed by the runbook operation. For example, if the operations of the runbook are directed to analyzing the performance of a load-balancer, the system may obtain traffic information and memory information from each server serviced by the load-balancer.

The system may generate the supplemental information based on a second set of runbook operation results that are selected based at least in part on the first set of runbook operation results. For example, a user may execute a runbook operation to obtain the first set of runbook results. Based on the first set of runbook results, the system may select a set of runbook operations to provide to a user. The user may execute one of the runbook operations to generate a second set of runbook operation results. The system may generate the supplemental information based on the operations of the first runbook, the operations of the second runbook, or by a combination of the operations of the first runbook and the second runbook.

The system may apply a machine learning model to a set of data associated with the runbook operation to identify related devices or other sources from which the system may obtain supplemental data. For example, if a user executes a runbook operation to obtain a set of performance data for a component, the system may apply a machine learning model to the performance data to identify one or more of: (a) another component from which to obtain supplemental data, and (b) another runbook to be presented to the user. In one embodiment, the system obtains the supplemental information from the identified component without any user input to request the system to obtain the supplemental information.

In addition, or in the alternative, the system may generate supplemental information based on input data associated with a runbook operation. For example, if a runbook operation checks an operating status of a component, the supplemental information may include one or more input values that affect the operating status, such as power, data transmission level, data transmission history, and temperature.

The system displays the supplemental information in the runbook execution interface (Operation 218). In addition, the system displays the runbook operation results (Operation 220). According to one example in which the user obtains a set of data as a result of a runbook operation, the system may overlay the supplemental information over the set of data obtained by the user to provide the user with a visual comparison of the user-obtained data and the supplemental information. Additional examples of system-generated visualizations to enable comparison of user-obtained data and the supplementary information include: a side-by-side table or chart and a side-by-side visual depiction of a component or part of a component. The system may provide a user interface element in the runbook execution interface to allow the user to select whether to display or hide the supplementary information. According to another example, the system displays the supplemental information together with a visualization of the runbook.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
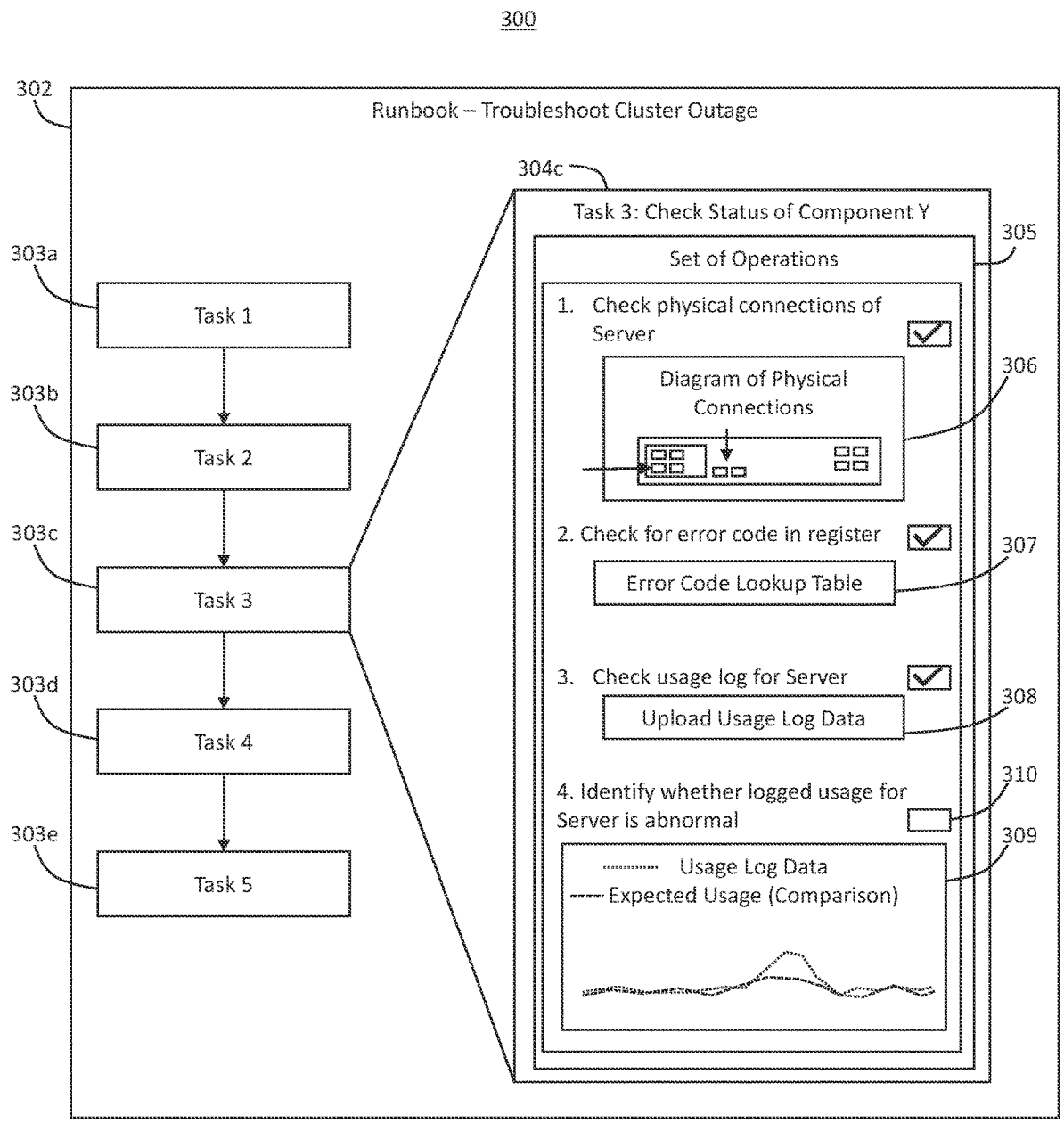
FIGS. 3A-3C illustrate examples of a runbook execution interface.
Figure 3B:
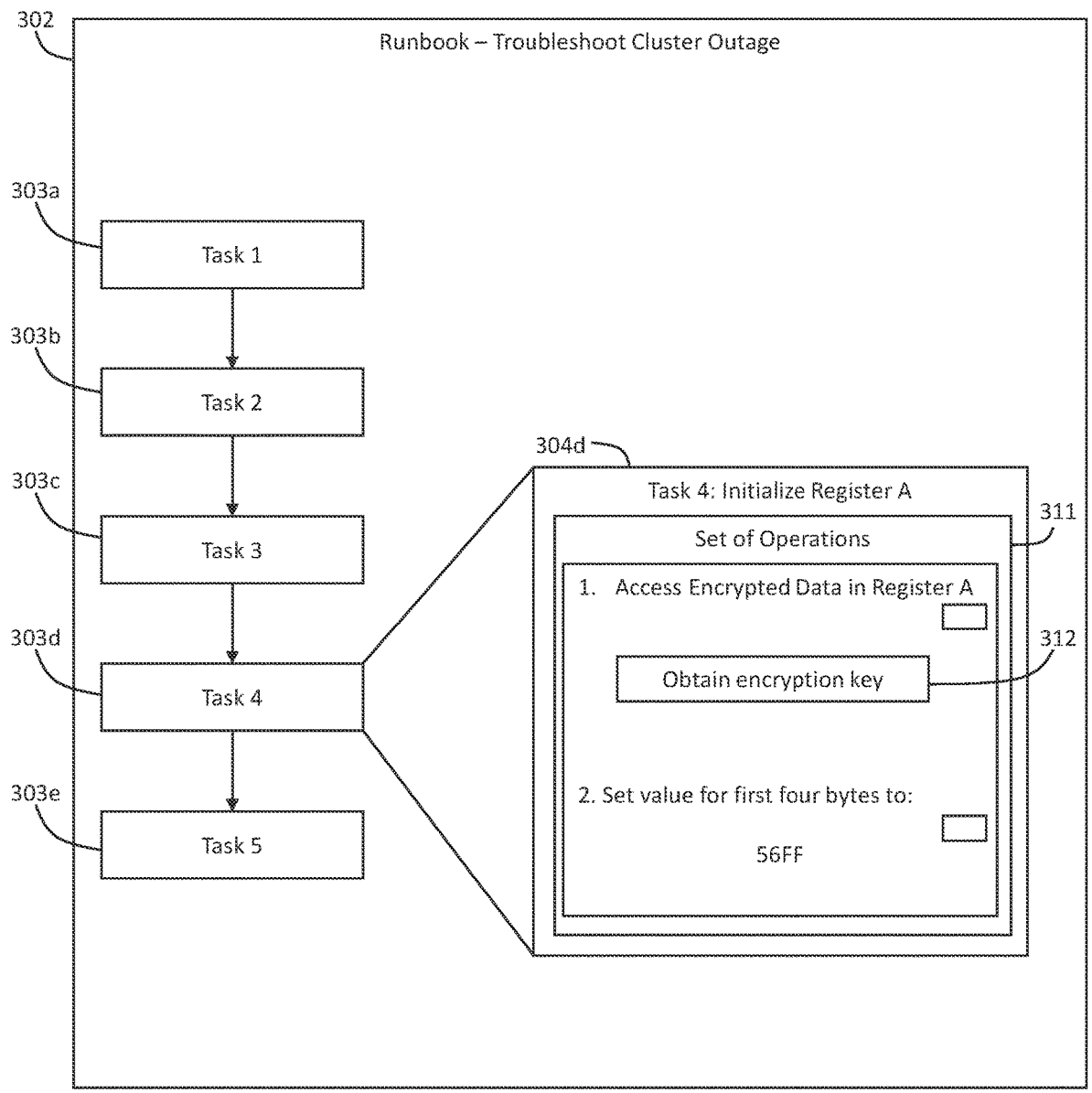
Figure 3C:
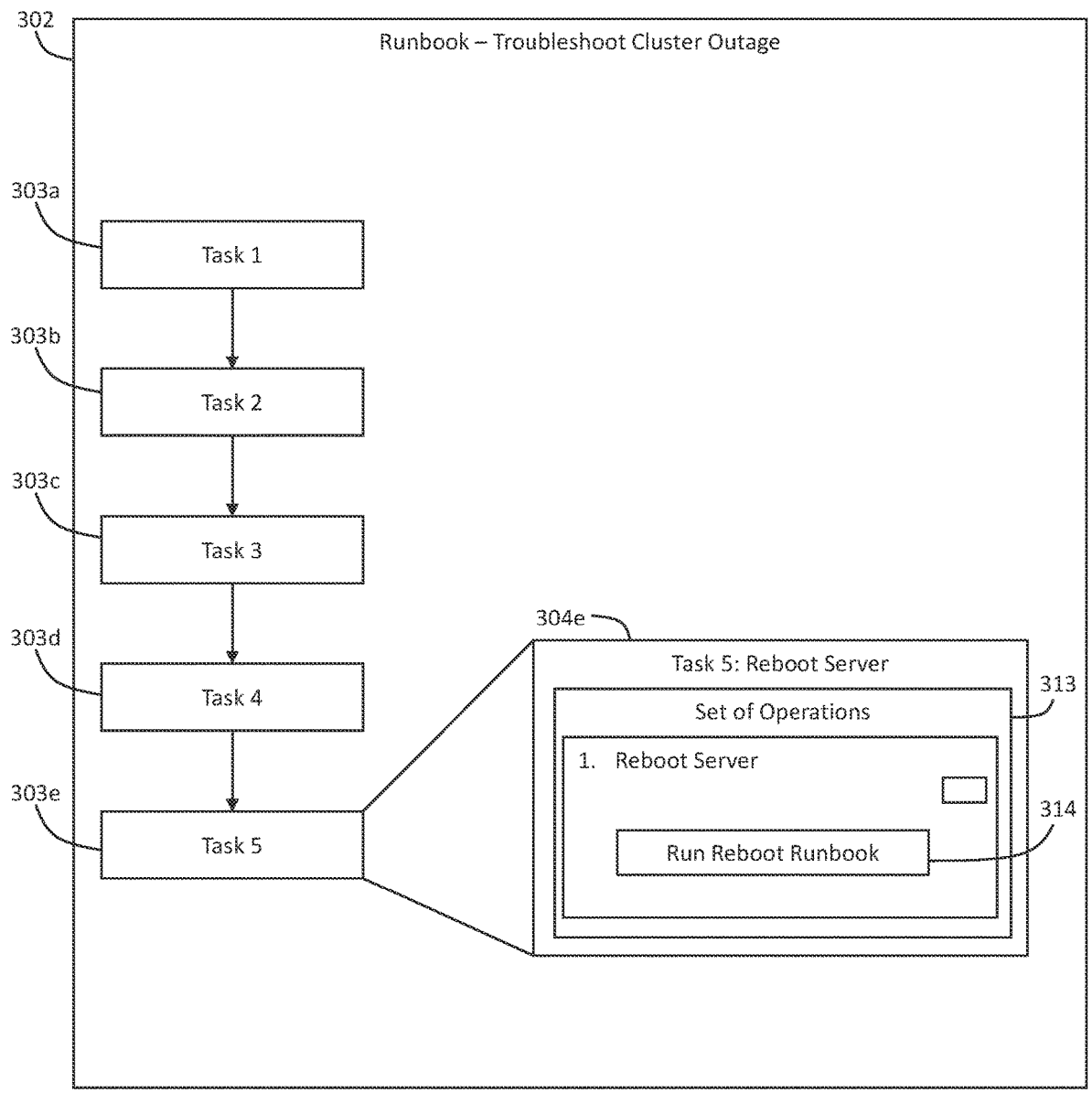

FIGS. 3A-3C illustrate a runbook execution interface 300 according to an example embodiment. A user selects a runbook display 302 to display. In the example illustrated in FIG. 3A, the runbook display 302 is directed to troubleshooting a cluster outage of a server cluster. The runbook includes a series of tasks 303a-303e. Each task is made up of one or more operations or steps. Based on selection of the task 3, the runbook execution interface 300 displays a window 304c. The window displays a set of operations 305 associated with the selected task. The set of operations 305 includes checking physical connections of a server, checking for an error code in a register, checking a usage log for the server, and identifying whether logged usage is abnormal.

The operations are independently executable. In addition, the operations may be performed out of sequence. For example, a user could check a usage log for the server (operation 3) prior to checking for an error code in the register (operation 2). However, operations 3 and 4 are required to be executed in sequence. A user must check the usage log for the server (operation 3) prior to identifying whether the logged usage for the server is abnormal (operation 4).

The system analyzes the runbook operations 305 and retrieves supplemental information associated with the operations. In the example illustrated in FIG. 3A, based on the system displaying the set of operations 305, and without receiving any user input to obtain supplemental information, the system analyzes metadata associated with an operation to check physical connections of a server. The system identifies in metadata the location in memory of a diagram, generated by an author of the runbook, that illustrates the physical locations of the data ports. The system, without receiving any user input associated with performance of the runbook operation, retrieves and displays a diagram 306 illustrating an image of physical locations of data ports associated with an operation to check physical connections of a server. The system analyzes the operation to check for an error code in a register. The system identifies in a product specification associated with a server an error code lookup table. Without receiving any user input associated with checking for the error code in the register, the system displays a user-selectable interface element 307 to allow the user to retrieve the lookup table. While the user checks for the error code in the specified register, the user may compare any observed error code with a corresponding error code in the lookup table. The system analyzes the runbook operation to check a usage log for the server. Examples of usage include: an amount of data received, an amount of data transmitted, a data transmission rate, and an amount of data stored. The system may identify the type of operation to be performed by the user and provide a link to allow the user to view or upload the usage log for the component. The system identifies a location of the usage log in memory. The system displays a user-selectable interface element 308 to allow the user to upload the usage log data from the location specified in memory. The system analyzes the operation to identify whether logged usage is abnormal. Without receiving user input to execute the runbook operation, the system applies a machine learning model to past usage data to identify an expected level of usage for a specified period of time. The system obtains the log data uploaded by the user in the runbook operation 3 of task 303c. Without receiving user input to generate the chart 309, the system displays supplemental information that includes the chart 309 showing the retrieved usage log data overlaid on top of the expected usage data predicted by the machine learning model. As discussed above, the system may generate the supplemental information based on one or more of: (a) a performance of the same component over a different period of time, (b) a performance of a comparable component over a same period of time, (c) an expected performance of the component based on specifications or known performance values, (d) an expected performance of the component based on applying a machine learning model to a set of performance data, and (e) an expected performance of the component based on a performance of topologically-connected components.

Referring to FIG. 3B, when the user selects the next task 303d in the runbook display 302, the system displays a window 304d for the task and determines whether supplemental information exists associated with the set of operations 311. The system may identify a location in memory of an encryption key required by the system to allow the user to access encrypted data in a register. The system retrieves the encryption key and generates a user-selectable interface element 312, without receiving user input to direct the system to generate an interface element 312. Upon selection by the user, interface element 312 retrieves the encryption key from memory and displays the encryption key for the user. The system may determine that the operation to set a value for bytes in the register does not have any supplemental information associated with the operation. Instead, the values for the first four bytes of the register "56FF" may be provided by the runbook author when the runbook is created.

Referring to FIG. 3C, when the user selects the task 303e of the runbook display 302, the system displays a window 304e including a set of operations 313. The set of operations 313 includes one operation: reboot server. The system analyzes the operation to determine whether supplemental information exists associated with the operation. The system identifies another runbook directed to rebooting the server. The system identifies the additional runbook without receiving user input directing the system to look for the additional runbook. The system displays an interface element 314 which, when selected, opens a separate runbook including a set of steps for rebooting a server. The system displays the interface element 314 without receiving user input directing the system to display the interface element 314.

The system may display supplementary information in the runbook display 302 based on execution of the runbook accessed by the interface element 314. The system may combine supplementary information from operations associated with different runbooks. For example, when the user performs the operations of the runbook to reboot the server, indicated by the interface element 314 of FIG. 3C, the system may display a chart comparing a data transmission rate at the server prior to rebooting the server with a data transmission rate subsequent to rebooting the server. The system may overlay the results from one runbook operation of one runbook over the results of the other runbook operation from the separate runbook.

5. Machine Learning Engine Training

Figure 4:
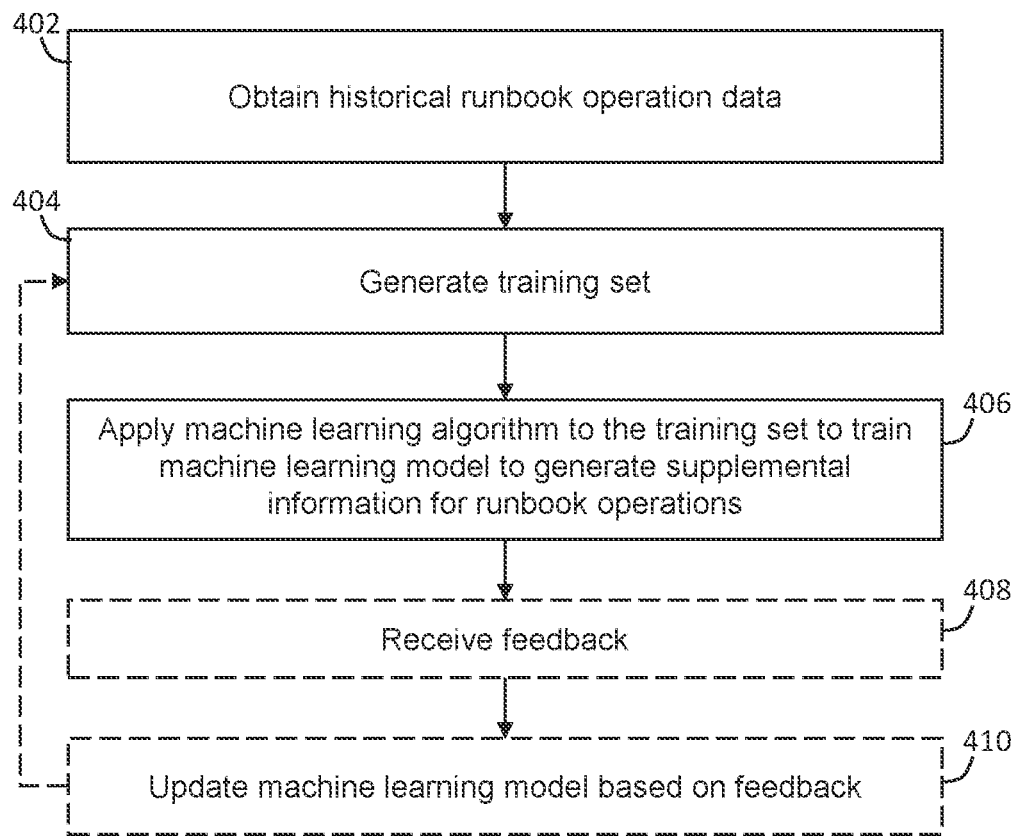
FIG. 4 illustrates an example set of operations for training a machine learning model to generate supplemental information for a runbook operation, according to one or more embodiments.

FIG. 4 illustrates an example set of operations for training a machine learning model to generate supplementary information associated with a runbook operation, in accordance with one or more embodiments. A system obtains historical runbook operation data (Operation 402). For example, the system may identify runbook operations and data accessed by a user when performing the runbook operations. The system may also identify events associated with the runbooks and supplementary information associated with the events. The system may also identify a topology associated with the runbook—such as relationships among components that are acted on in the runbook and other components—and supplementary information associated with the topology.

For example, the system may identify a runbook operation to "reset user permissions" in a particular application. The system may identify a server on which the application is running (e.g., topology data), an authorization key that has been used by an operator in the past to reset the user permissions (e.g., past user actions), and log data indicating previous user login attempts (e.g., event data).

Once the various data (or subsets thereof) are identified in Operation 402, the system generates a set of training data (operation 404). Training data may include sets of runbook operations and supplemental data associated with the respective runbook operations. The training data may pair a single runbook operation with particular supplemental information. Alternatively, or in addition, the system may pair sets of two or more runbook operations with a particular supplemental information. For example, the system may associate a graph illustrating two sets of readings obtained from two different runbook operations with the pair of runbook operations. In addition, the training data may include multiple instances of a single operation associated with different supplemental information.

The system applies a machine learning algorithm to the training data set (Operation 406). The machine learning algorithm analyzes the training data set to identify data and patterns that indicate relationships between particular types of supplemental information and particular runbook operations. Types of machine learning models include, but are not limited to, linear regression, logistic regression, linear discriminant analysis, classification and regression trees, naïve Bayes, k-nearest neighbors, learning vector quantization, support vector machine, bagging and random forest, boosting, backpropagation, and/or clustering.

In examples of supervising ML algorithms, the system may obtain feedback on the whether a particular instance of supplemental information should be associated with a particular runbook operation (Operation 408). The feedback may affirm that a particular instance of supplemental information should be associated with the particular runbook operation. In other examples, the feedback may indicate that a particular instance of supplemental information should not be associated with the corresponding runbook operation(s). Based on the feedback, the machine learning training set may be updated, thereby improving its analytical accuracy (Operation 410). Once updated, the system may further train the machine learning model by optionally applying the model to additional training data sets.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources.

Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
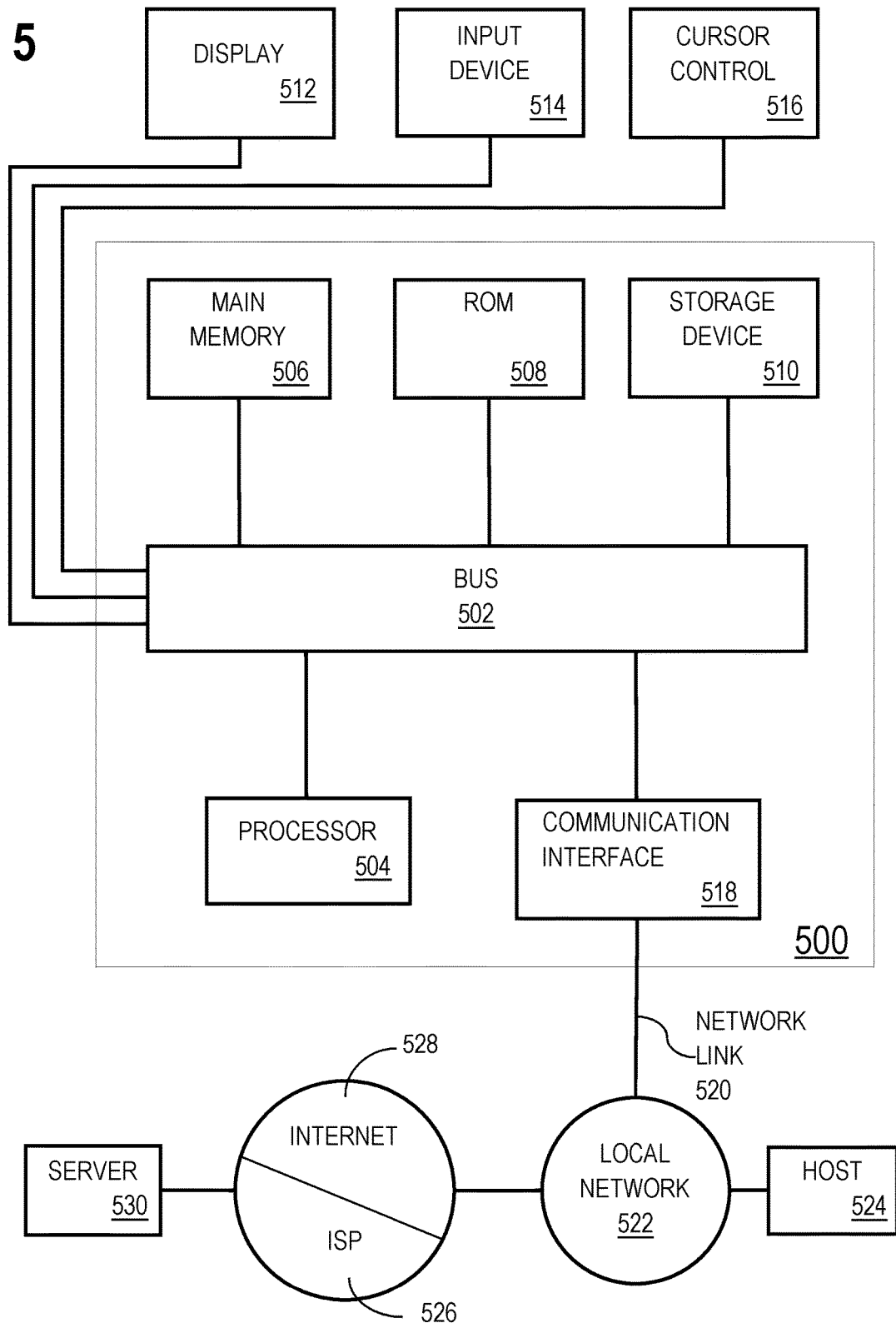
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   presenting a runbook for remediating a first event, the runbook defining a plurality of independently executable operations;
   receiving user input to execute a first independently executable operation, associated with a first system component, from among the plurality of independently executable operations;
   executing the first independently executable operation to obtain a first set of runbook operation results;
   presenting the first set of runbook operation results corresponding to the first independently executable operation associated with the first system component;
   generating supplemental information based on at least one of: (a) the first system component associated with the first independently executable operation, and (b) the first set of runbook operation results corresponding to the first independently executable operation; and
   displaying the supplemental information.

2. The non-transitory computer readable medium of claim 1, wherein the first set of runbook operation results comprises information associated with a first period of time, and wherein the supplemental information comprises information associated with a second period of time that is different than the first period of time.

3. The non-transitory computer readable medium of claim 1, wherein the supplemental information includes past performance data of the first system component, and
   wherein displaying the supplemental information includes overlaying the past performance data over performance data, for the first system component, associated with the first event.

4. The non-transitory computer readable medium of claim 1, wherein the supplemental information comprises information associated with a second system component that is at least one of: (a) communicatively coupled with the first system component, (b) has a topological relationship with the first system component, or (c) meets a similarity criteria in relation to the first system component.

5. The non-transitory computer readable medium of claim 1, wherein the supplemental information comprises information associated with a second set of runbook operation results that are selected based at least in part on the first set of runbook operation results.

6. The non-transitory computer readable medium of claim 1, wherein the supplemental information is based on the first system component and displayed prior to executing the first independently executable operation to obtain the first set of runbook operation results.

7. The non-transitory computer readable medium of claim 1, wherein the supplemental information is not required for execution of the first independently executable operation and is not specified by the first independently executable operation.

8. The non-transitory computer readable medium of claim 1, wherein the supplemental information is generated by executing code of a runbook management system that uses as input: (a) the first independently executable operation or (b) the first set of runbook operation results.

9. The non-transitory computer readable medium of claim 1, wherein the supplemental information includes expected performance data for the first system component, and
   wherein displaying the supplemental information includes overlaying the expected performance data over performance data, for the first system component, associated with the first event.

10. The non-transitory computer readable medium of claim 1, wherein generating the supplemental information includes:
    applying a machine learning model for a system including the first system component to a set of data associated with the first event, the machine learning model trained to identify relationships between runbook operations and respective instances of supplemental information; and
    based on an output of the machine learning model, selecting the supplemental information.

11. The non-transitory computer readable medium of claim 1, wherein the runbook is presented to a user in a graphical user interface (GUI),
    wherein the user input to execute the first independently executable operation is received based on presenting the runbook in the GUI,
    wherein the first independently executable operation is executed based on receiving the user input, and
    wherein the first set of runbook operation results is presented in the GUI.

12. The non-transitory computer readable medium of claim 1, wherein the supplemental information is displayed in a graphical user interface (GUI) concurrently with the first set of runbook operation results.

13. A method comprising:
    presenting a runbook for remediating a first event, the runbook defining a plurality of independently executable operations;
    receiving user input to execute a first independently executable operation, associated with a first system component, from among the plurality of independently executable operations;
    executing the first independently executable operation to obtain a first set of runbook operation results;
    presenting the first set of runbook operation results corresponding to the first independently executable operation associated with the first system component;

generating supplemental information based on at least one of: (a) the first system component associated with the first independently executable operation, and (b) the first set of runbook operation results corresponding to the first independently executable operation; and displaying the supplemental information.

14. The method of claim 13, wherein the first set of runbook operation results comprises information associated with a first period of time, and wherein the supplemental information comprises information associated with a second period of time that is different than the first period of time.

15. The method of claim 13, wherein the supplemental information includes past performance data of the first system component, and
wherein displaying the supplemental information includes overlaying the past performance data over performance data, for the first system component, associated with the first event.

16. The method of claim 13, wherein the supplemental information comprises information associated with a second system component that is at least one of: (a) communicatively coupled with the first system component, (b) has a topological relationship with the first system component, or (c) meets a similarity criteria in relation to the first system component.

17. The method of claim 13, wherein the supplemental information comprises information associated with a second set of runbook operation results that are selected based at least in part on the first set of runbook operation results.

18. The method of claim 13, wherein the supplemental information is based on the first system component and displayed prior to executing the first independently executable operation to obtain the first set of runbook operation results.

19. The method of claim 13, wherein the supplemental information is not required for execution of the first independently executable operation and is not specified by the first independently executable operation.

20. The method of claim 13, wherein the supplemental information is generated by executing code of a runbook management system that uses as input: (a) the first independently executable operation or (b) the first set of runbook operation results.

21. The method of claim 13, wherein the supplemental information includes expected performance data for the first system component, and
wherein displaying the supplemental information includes overlaying the expected performance data over performance data, for the first system component, associated with the first event.

22. A system comprising:
one or more processors; and
memory storing instructions that, when executed by the one or more processors, cause the system to perform operations comprising:
presenting a runbook for remediating a first event, the runbook defining a plurality of independently executable operations;
receiving user input to execute a first independently executable operation, associated with a first system component, from among the plurality of independently executable operations;
executing the first independently executable operation to obtain a first set of runbook operation results;
presenting the first set of runbook operation results corresponding to the first independently executable operation associated with the first system component;
generating supplemental information based on at least one of: (a) the first system component associated with the first independently executable operation, and (b) the first set of runbook operation results corresponding to the first independently executable operation; and
displaying the supplemental information.

* * * * *

UNITED STATES PATENT AND TRADEMARK OFFICE
CERTIFICATE OF CORRECTION

PATENT NO. : 11,934,296 B2
APPLICATION NO. : 17/725147
DATED : March 19, 2024
INVENTOR(S) : Patti et al.

It is certified that error appears in the above-identified patent and that said Letters Patent is hereby corrected as shown below:

On the Title Page

On page 3, Column 1, under Item (56) Other Publications, Lines 4-5, delete "Newtork Moniroting" and insert -- Network Monitoring --, therefor.

In the Specification

In Column 1, Line 8, delete "63/262,832" and insert -- 63/261,832 --, therefor.

In Column 1, Line 11, delete "August 24;" and insert -- Aug. 24, 2021; --, therefor.

In Column 1, Line 12, delete "August 24;" and insert -- Aug. 24, 2021; --, therefor.

In Column 1, Line 13, delete "August 24," and insert -- Aug. 24, 2021, --, therefor.

Signed and Sealed this
Thirtieth Day of July, 2024

Katherine Kelly Vidal
*Director of the United States Patent and Trademark Office*